(12) United States Patent  
Juranitch

(10) Patent No.: US 10,392,286 B2  
(45) Date of Patent: Aug. 27, 2019

(54) VITRIFIED MATERIAL CONTROL SYSTEM AND METHOD

(71) Applicant: Plasma Tech Holdings, LLC, Bedford, NH (US)

(72) Inventor: James C. Juranitch, Fort Lauderdale, FL (US)

(73) Assignee: Plasma Tech Holdings, LLC, Bedford, NH (US)

( * ) Notice: Subject to any disclaimer, the term of this patent is extended or adjusted under 35 U.S.C. 154(b) by 0 days.

(21) Appl. No.: 15/937,696

(22) Filed: Mar. 27, 2018

(65) Prior Publication Data

US 2018/0319693 A1 Nov. 8, 2018

Related U.S. Application Data

(62) Division of application No. 15/003,737, filed on Jan. 21, 2016, now Pat. No. 9,926,217.

(60) Provisional application No. 62/106,077, filed on Jan. 21, 2015.

(51) Int. Cl.
| | |
|---|---|
| *C03B 5/24* | (2006.01) |
| *C03B 5/26* | (2006.01) |
| *C03B 5/28* | (2006.01) |
| *C03B 5/02* | (2006.01) |
| *C03B 5/235* | (2006.01) |

(Continued)

(52) U.S. Cl.
CPC ................ *C03B 5/28* (2013.01); *C03B 5/025* (2013.01); *C03B 5/235* (2013.01); *C03B 5/24* (2013.01); *C03B 3/02* (2013.01); *C03B 37/055* (2013.01)

(58) Field of Classification Search
None
See application file for complete search history.

(56) References Cited

U.S. PATENT DOCUMENTS 3,266,881 A * 8/1966 Novack ................. C03B 7/082
                                                            65/130
3,689,050 A    9/1972 Acker et al.
4,218,201 A    8/1980 Kozima et al.
(Continued)

FOREIGN PATENT DOCUMENTS

CN    1616886 A    5/2005
EP    0134336 A1   3/1985
(Continued)

*Primary Examiner* — Cynthia Szewczyk
(74) *Attorney, Agent, or Firm* — Dykema Gossett PLLC

(57) ABSTRACT

Systems and methods for controlling the flow of vitrified material. In at least some embodiments, a vitrified material control system comprises a melt chamber (8) configured to contain a molten material (27) during operation of the control system; a siphon valve (11) configured to facilitate a flow of the molten material from the melt chamber; and a vacuum-generation system (26, 15, 16) configured to controllably deliver a vacuum to the molten material in the melt chamber and to thereby regulate a flow of the molten material from the melt chamber. In other embodiments, methods of controlling a flow of molten vitrified material from a heating device are disclosed. The methods may include, for example, applying a vacuum to the molten material to control a dwell time of the molten material in a vessel of the heating device and regulating the vacuum based on a measured temperature of the molten material.

20 Claims, 4 Drawing Sheets

(51) Int. Cl.
C03B 37/05 (2006.01)
C03B 3/02 (2006.01)

(56) References Cited

U.S. PATENT DOCUMENTS

| | | | |
|---|---|---|---|
| 4,340,160 | A | 7/1982 | van Geel et al. |
| 5,559,827 | A * | 9/1996 | Shimada ................ B22D 39/06 266/242 |
| 5,849,058 | A * | 12/1998 | Takeshita .............. C03B 5/1875 65/134.2 |
| 6,160,238 | A | 12/2000 | Titus et al. |
| 2007/0022780 | A1 | 2/2007 | House et al. |
| 2014/0166934 | A1 | 6/2014 | Juranitch |
| 2014/0245793 | A1 | 9/2014 | Howse et al. |

FOREIGN PATENT DOCUMENTS

| | | |
|---|---|---|
| WO | 199835916 A1 | 8/1998 |
| WO | 2008086991 A1 | 7/2008 |

* cited by examiner

VITRIFIED MATERIAL CONTROL SYSTEM AND METHOD

CROSS-REFERENCE TO RELATED APPLICATIONS

This application is a divisional of U.S. application Ser. No. 15/003,737, filed 21 Jan. 2016 (the '737 application) and issued as U.S. Pat. No. 9,926,217 on 27 Mar. 2018 (the '217 patent), which claims the benefit of U.S. provisional application No. 62/106,077, filed 21 Jan. 2015 (the '077 application). The '217 patent, the'737 application, and the '077 application are all hereby incorporated by reference as though fully set forth herein.

BACKGROUND a. Field

This disclosure relates generally to a system and method for controlling the flow of hot vitrified material. The system and method can, in an embodiment, be successfully used for the manufacturing of renewable aggregate or renewable fiber products.

b. Background Art

High temperature vitrification is used to produce many modern products. Vitrification is the transformation of a material into a glass. The materials are usually inorganic in nature and many times amorphous in structure. The present disclosure is not limited to amorphous materials only.

The first phase of the vitrification process is the melting of material. During and after the melt is accomplished, it is challenging to control the pour flow and temperature of the molten material. The molten material can many times have a high melting temperature such as 2,000 to 4,000 degrees F. To control the pour flow of this high-temperature material reliably is a challenge.

Current high temperature pouring systems may incorporate a siphon valve into the outlet of a cupola. An example of this system can be seen in international publication number WO 2008/086991 A1 by Lars Elmekilde Hansen et al., which is hereby incorporated by referenced as though fully set forth herein. In this publication, the amorphous material is a silicon-based mix used to manufacture fiber. The siphon valve only keeps gasses from migrating in or out of the cupola. The amorphous material pours at will as it becomes viscous enough to overcome gravity and exit the cupola. Most modern pouring systems work this way. Siphon valves have been used to allow the flow of a liquid without allowing the back flow of gasses for many years. Those skilled in the art will find numerous examples of siphon valves in a normal household. Every sink drain or toilet will have a siphon valve. The valves are also known as "S-traps" and were patented by Alexander Cummings in 1775.

In the production of modern high-quality fibers, the uncontrolled flow of molten material is not ideal. Temperature in conventional systems for the pour is also very difficult to maintain or control under these conditions. The lack of temperature control negatively affects the quality of fiber or aggregate that is produced. There remains a need to address these problems.

BRIEF SUMMARY

The foregoing and other objects are achieved by the disclosed embodiments, which provide systems and methods for controlling the flow of hot, molten, vitrified material. The method can, in an embodiment, be successfully used for the manufacturing of conventional or renewable aggregate and fiber products. One of the methods of producing high-quality fiber is to develop a molten stream of inorganic product which is directed over a set of spinning wheels. The quantity of wheels is based on the production volume and will be a minimum of 1 wheel, but can be greater than 4 wheels. Modern high-quality fiber has specific requirements relating to its chemistry, fiber diameter, and fiber length. The fiber lengths and diameter can be controlled by the quantity of molten flow over the wheels, the viscosity of the molten flow, and the wheel speeds. The viscosity of the melt can be affected by the pour temperature and the material chemistry. The pour temperature usually requires different dwell times in the melter to control or affect the pour temperature. It may also require additional energy being added to the main furnace and the siphon valve pool to counteract energy losses. To control the flow and temperature of the melt, a control valve and energy management method is required. The disclosed embodiments teach a complete valve system employing a siphon valve component that can control both the rate of molten flow and the ability to turn the flow off or on to generate a dwell time in the melter for the inorganic material to reach optimum mix quality and temperature. Additional energy can also be applied to the melt in the siphon pool on exit as part of the embodiments.

This valve system works well with modern renewable syngas generation systems, natural gas, or other torch fired systems, including oxygen enriched torch systems and specifically plasma torch based melters.

The foregoing and other aspects, features, details, utilities, and advantages of the present embodiments will be apparent by reading the following description and claims, and from reviewing the accompanying drawings.

DETAILED DESCRIPTION OF EMBODIMENTS

Figure 1:
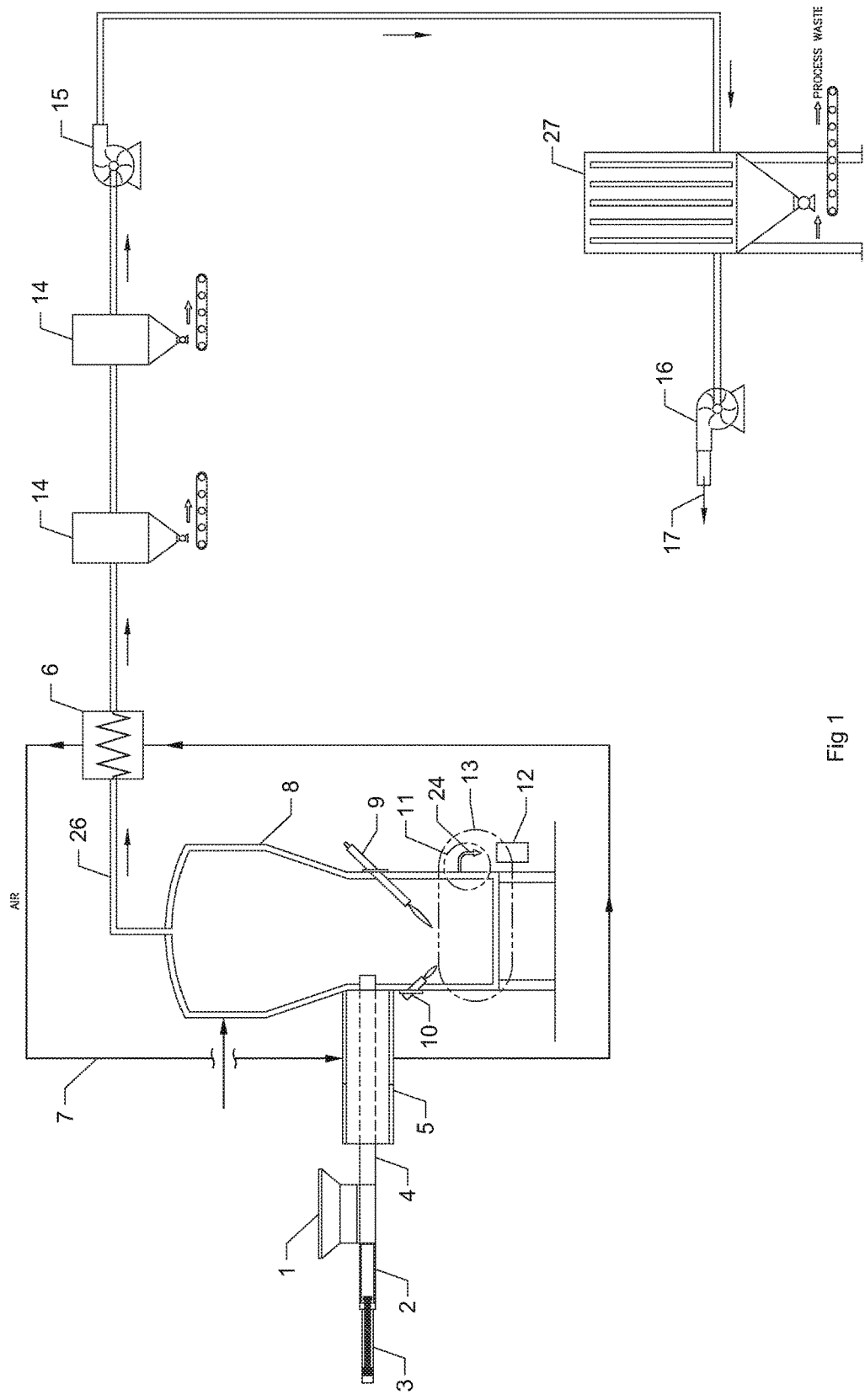
FIG. 1 is a simplified schematic representation of a specific illustrative embodiment of a system configured in accordance with the principles of the disclosed embodiments.
Figure 2:
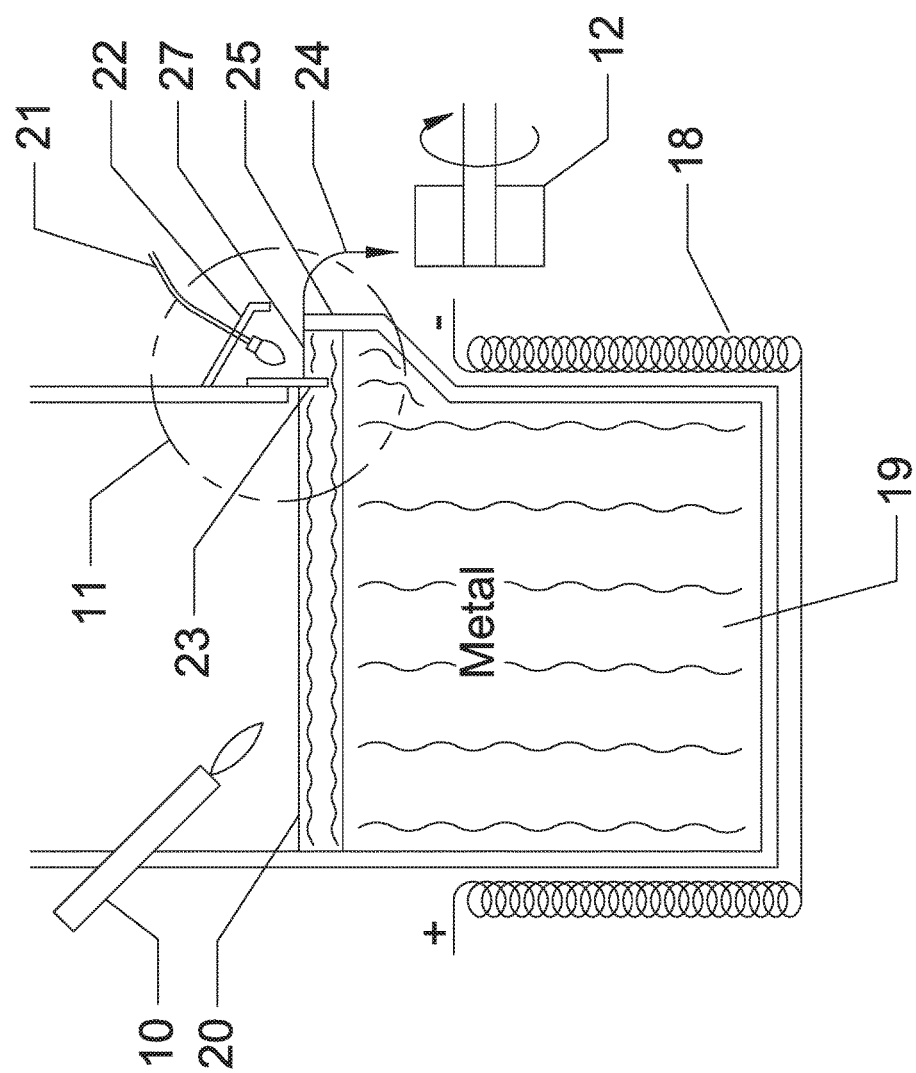
FIG. 2 is a more detailed side view of the siphon valve and melt subsystem.

Referring first to FIGS. 1 and 2, the vitrified material control system comprises a siphon valve 11, which includes a control brick or shield or plate 23 and an outlet dam 25. Due to the extreme duty that this siphon valve 11 must endure, the vertical distance that this control brick 23 projects downwardly from a wall of the sealed chamber 8 (and, thus, the distance this plated projects into the melt pool 27) is adjustable. The control brick 23 can be lowered as the siphon valve 11 is eroded. The outlet dam 25 can also be renewed, adjusted to compensate for wear and replaced as required. The torch 21 makes it possible to selectably add additional energy to melt pool 27. The torch can be any heat source and can run on any fuel such as propane or natural gas. The torch 21 could also be an electrical arc torch. The heat shield 22 helps minimize heat losses from melt pool 27, torch 21, melt 20, and pour 24. In the depicted embodiment, the outlet dam 25 is a replaceable part of the siphon valve 11. The heat shield 22, the torch 21, the adjustable control brick 23, and the adjustable and replaceable outlet dam 25 are attached to, or integrated into, the sealed chamber 8 (labeled in FIG. 1). Sealed chamber 8 is in communication with conduit 26. Conduit 26 is drawn down into a vacuum condition by induction fans 15 and 16. Two fans are shown, but one or more fans could be employed.

Figure 3:
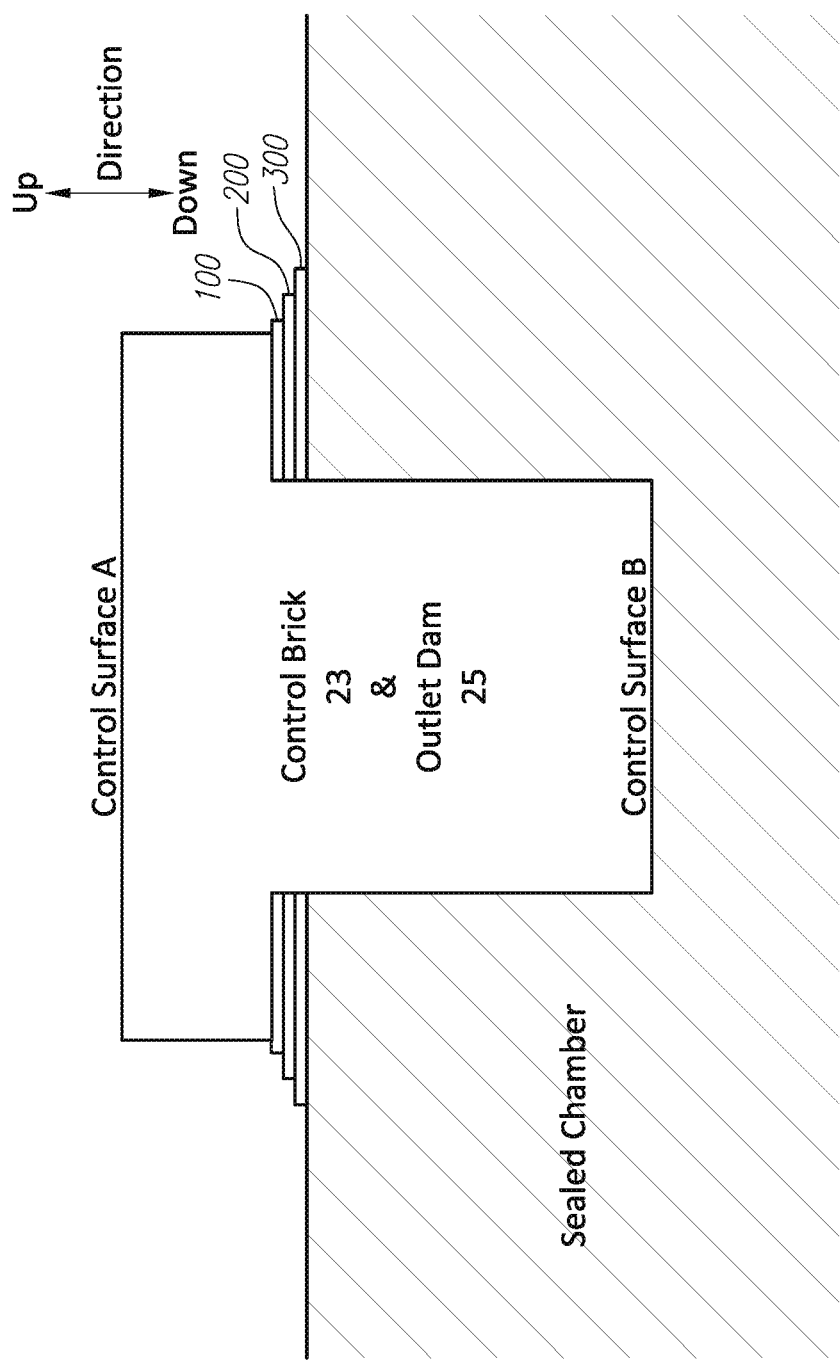
FIG. 3 is a simplified schematic representation of a specific illustrative embodiment of a control brick and outlet dam configured in accordance with the principles of the disclosed embodiments.

FIG. 3 shows an embodiment of an adjustable and replaceable control brick 23 and an adjustable and replaceable outlet dam 25. A plurality of shims (shims 100, 200, 300 are shown in FIG. 3 by way of example and without limitation) are added or removed for adjustment up or down of the control brick 23 or outlet dam 25. Control surface A is used in the case of the outlet dam and shims are added to adjust for wear. Control surface B is used as control brick 23 wears and the brick or gate is lowered. This is one of many possible embodiments to compensate for wear.

Induction fans 15, 16 are shown, but any evacuating system such as an ejector or venturi could also be employed to draw down a vacuum in the sealed chamber 8. In normal operation, the induction fans are in a favorable embodiment powered by variable frequency drives. The variable frequency drives are not shown for clarity. Those schooled in the art should be familiar with variable frequency drives. Two induction fans are taught herein since fan 15 can be employed to accomplish finer vacuum control in chamber 8. That will, in turn, produce finer flow control of pour 24 and of melt pool 27 height relative to outlet dam 25 in the valve system.

Figure 4:
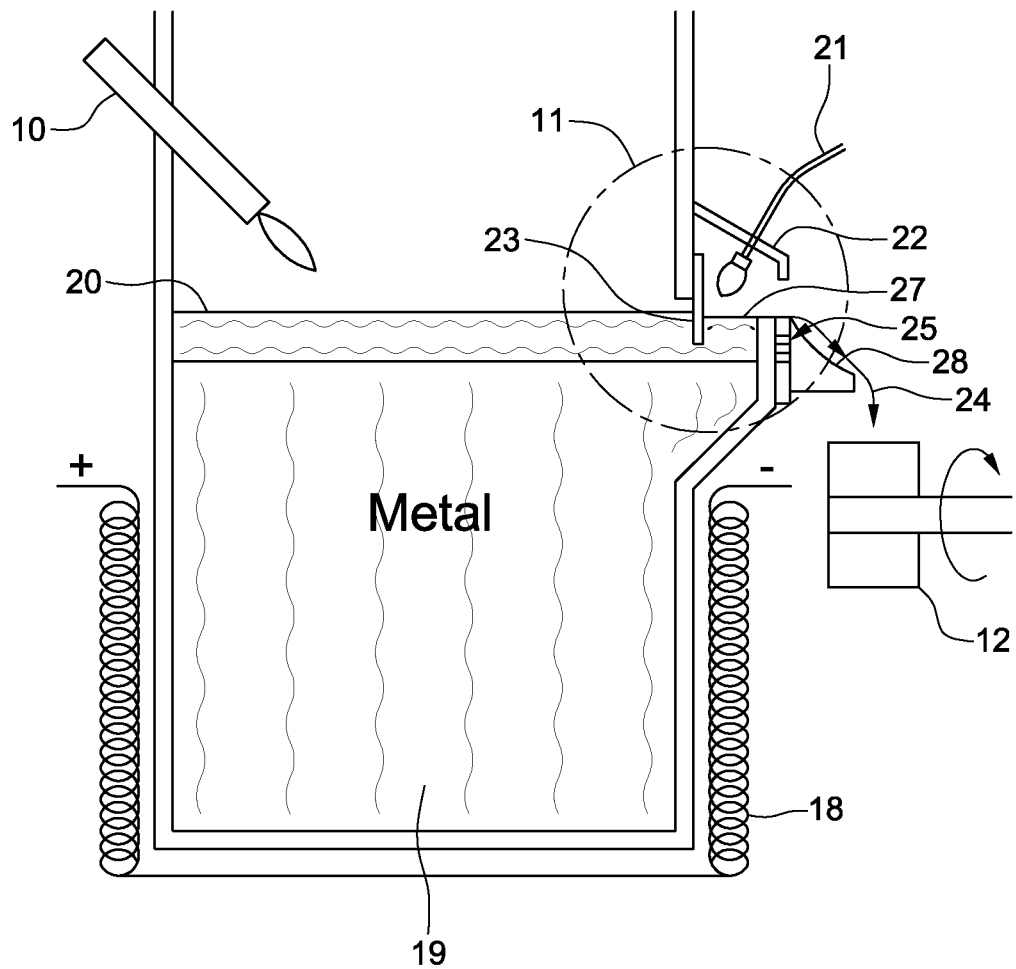
FIG. 4 is similar to FIG. 2, but depicts an optional outlet pour ramp and more clearly shows the outlet dam comprising the outlet dam configuration shown in FIG. 3.

FIG. 4 is similar to FIG. 2, but depicts an optional outlet pour ramp 28 and more clearly shows the outlet dam 25 comprising the outlet dam configuration shown in FIG. 3. Although alternative configurations for the outlet dam and the control brick are possible, the configuration depicted in FIG. 3 may be used for both the outlet dam 25 as well as for the control brick 23. If the outlet pour ramp 28 is present, it can assist with the control of the outlet flow.

Induction fans 15 and or 16 are driven by their electrical drives typically in a close looped pressure control fashion to maintain a vacuum condition that is great enough to pull pour 24 from melt pool 27 up into chamber 8. This suction and melt level modification lowers the fluid level of melt pool 27, which then converts the siphon valve 11 into a unique control valve system. The flow volume of melt pour 24 can be controlled by the ramping of the vacuum level in chamber 8 at a controlled rate. Flow of pour 24 can be stopped at any time by increasing the vacuum level in chamber 8 through the employment of induction fans 15 or 16 until melt pool 27 is lowered below the control height of dam 25. Pour 24, for the sake of clarity, is shown to be directed onto wheel 12 to produce fiber. Pour 24 is advantageously temperature controlled by the addition of thermal energy through plasma torch 9 or conventional torch 10 using any fuel such as propane or natural gas with or without oxygen enrichment. Metal bath 19 in FIG. 2 is employed as a temperature stabilizing environment, but also injects some thermal energy into melt 20 and pour 24. Metal bath 19 is reacted against current generated from induction coil 18 to generate thermal energy.

Material feed system 5 communicates with sealed chamber 8 via conduit 4. In order to keep chamber 8 sealed, feedstock is injected through plunger system 2 via hydraulic ram 3. The feedstock is communicated with conduit 4 through feeder 1 as ram 2 retracts to open a port (not shown for clarity) into feeder hoper number 1.

Thermal energy can also be transferred to the feedstock to reduce the work required of torches 9, 10 and metal bath 19 by employing pre-heating of the feedstock through heated air in conduit 7. The heated air receives its energy from heat exchanger 6. Emissions control cyclones 14 and bag house 27 are familiar to those schooled in the art. A large variety of other emission control and exhaust gas conditioning components can be put in series or parallel (slip streams) with these basic examples of exhaust gas conditioning. The final exhaust gas product is show in FIG. 1 to be exiting as item 17.

The invention claimed is:

1. A method for controlling the flow of hot vitrified material in a manufacturing process that uses a heating device comprising a heat source, a melt chamber, and a control plate extending into the hot vitrified material, the method comprising the following:
   operating the heat source to create hot vitrified material in the melt chamber;
   applying a vacuum to an upper surface of the hot vitrified material to directly regulate a flow of the hot vitrified material from the melt chamber and out of the heating device; and
   adjusting how far the control plate extends into the hot vitrified material.

2. The method of claim 1 further comprising
   measuring a temperature of the hot vitrified material, and
   controlling the temperature of the hot vitrified material.

3. The method of claim 2, wherein the controlling step further comprises intermittently operating the heat source based on the measured temperature of the hot vitrified material.

4. The method of claim 2, wherein the controlling step further comprises intermittently applying the vacuum to the upper surface of the hot vitrified material based on the measured temperature of the hot vitrified material to thereby directly regulate the flow of the hot vitrified material from the melt chamber.

5. The method of claim 4, wherein the heating device further comprises a melt pool configured to deliver the hot vitrified material from the heating device, and wherein the vacuum intermittently applied to the upper surface of the hot vitrified material is sufficient to pull the hot vitrified material from the melt pool and back into the melt chamber.

6. The method of claim 5, wherein the method further comprises applying supplemental energy to the melt pool.

7. The method of claim 2, wherein the controlling step further comprises intermittently adjusting the vacuum applied to the upper surface of the hot vitrified material based on the measured temperature of the hot vitrified material to thereby directly regulate the flow of the hot vitrified material from the melt chamber.

8. The method of claim 7, wherein the heating device further comprises a melt pool configured to deliver the hot vitrified material from the heating device, and wherein the vacuum applied to the upper surface of the hot vitrified material is sufficient to pull the hot vitrified material from the melt pool and back into the melt chamber.

9. The method of claim 7, wherein the controlling step further comprises intermittently adjusting the operation of the heat source based on the measured temperature of the hot vitrified material.

10. The method of claim 1, wherein the operating step further comprises heating the hot vitrified material to between 2000 and 4000 degrees Fahrenheit.

11. The method of claim 1, wherein the operating step further comprises operating a torch.

12. The method of claim 1, wherein the operating step further comprises operating a metal bath.

13. The method of claim 1, wherein the applying step further comprises operating a suction device selected from the group consisting of a venturi, an ejector, and an induction fan.

14. The method of claim 1, wherein the applying step further comprises operating two induction fans connected in parallel or in series.

15. A method for controlling the flow of hot vitrified material in a manufacturing process that uses a heating device comprising a heat source and a melt chamber, the method comprising the following:
   operating the heat source to create hot vitrified material in the melt chamber, wherein the heat source comprises a torch;
   applying a vacuum to an upper surface of the hot vitrified material to directly regulate a flow of the hot vitrified material from the melt chamber and out of the heating device;
   measuring a temperature of the hot vitrified material; and
   controlling the temperature of the hot vitrified material.

16. A method for controlling the flow of hot vitrified material in a manufacturing process that uses a heating device comprising a heat source and a melt chamber, the method comprising the following:
   operating the heat source to create hot vitrified material in the melt chamber, wherein the heat source comprises a metal bath;
   applying a vacuum to an upper surface of the hot vitrified material to directly regulate a flow of the hot vitrified material from the melt chamber and out of the heating device;
   measuring a temperature of the hot vitrified material; and
   controlling the temperature of the hot vitrified material.

17. A method of controlling a flow of molten vitrified material from a heating device comprising a heat source, a vessel, and a siphon valve pool, the method comprising the following steps:
   a. producing a molten material in the vessel of the heating device;
   b. measuring a temperature of the molten material;
   c. applying a vacuum to an upper surface of the molten material to directly control a dwell time of the molten material in the vessel of the heating device;
   d. regulating the vacuum based on the measured temperature; and
   e. adjusting the temperature by selectably adding additional energy to the siphon valve pool, wherein the adjusting step further comprises operating a torch to selectably apply heat to the siphon valve pool.

18. The method of claim 17, wherein the measuring step further comprises measuring the temperature in the siphon valve pool.

19. The method of claim 17, wherein the producing step further comprises feeding raw material into the vessel.

20. The method of claim 19, wherein the producing step further comprises using an air-locked plunger system or an screw-auger system to feed raw material into the vessel.

* * * * *